(12) United States Patent
Li et al.

(10) Patent No.: US 10,969,557 B1
(45) Date of Patent: Apr. 6, 2021

(54) OPTICAL FIBER SHUFFLE

(71) Applicant: Fujin Precision Industrial (Jincheng)Co.,Ltd., Jincheng (CN)

(72) Inventors: Zhi-Ming Li, Shenzhen (CN); Dong-Dong Li, Jincheng (CN); Yao Li, Newark, CA (US)

(73) Assignee: Fujin Precision Industrial (Jincheng)Co., Ltd., Jincheng (CN)

( * ) Notice: Subject to any disclaimer, the term of this patent is extended or adjusted under 35 U.S.C. 154(b) by 0 days.

(21) Appl. No.: 16/742,059

(22) Filed: Jan. 14, 2020

(30) Foreign Application Priority Data

Nov. 22, 2019 (CN) .......................... 201911158064.3

(51) Int. Cl.
*G02B 6/44* (2006.01)

(52) U.S. Cl.
CPC .................................. *G02B 6/4471* (2013.01)

(58) Field of Classification Search
CPC .................................................. G02B 6/4471
See application file for complete search history.

(56) References Cited

U.S. PATENT DOCUMENTS

| | | | | |
|---|---|---|---|---|
| 6,389,214 B1* | 5/2002 | Smith | ................... | G02B 6/3878 385/136 |
| 6,464,404 B1* | 10/2002 | Robinson | ................. | G02B 6/04 385/137 |
| 6,655,848 B2* | 12/2003 | Simmons | ............. | G02B 6/3636 385/56 |
| 7,035,511 B1* | 4/2006 | Rhoney | ................ | G02B 6/4471 385/100 |
| 8,573,855 B2* | 11/2013 | Nhep | ..................... | G02B 6/4472 385/77 |
| 8,873,967 B2* | 10/2014 | Barnes | ................. | G02B 6/4453 398/141 |
| 9,057,862 B2* | 6/2015 | Strasser | ............... | G02B 6/4472 |
| 9,154,860 B2* | 10/2015 | Hessong | ............ | H04Q 11/0062 |
| 9,395,509 B2* | 7/2016 | Petersen | ............... | G02B 6/4471 |
| 9,548,603 B2* | 1/2017 | Loveless | ............... | G02B 6/3616 |
| 10,606,019 B2* | 3/2020 | Field | ......................... | G02B 6/44 |
| 10,678,012 B1* | 6/2020 | Wu | ........................... | G02B 6/4472 |
| 10,732,375 B2* | 8/2020 | Zhang | ..................... | G02B 6/443 |
| 10,768,388 B1* | 9/2020 | Hu | ............................ | G02B 6/28 |
| 2004/0126069 A1* | 7/2004 | Jong | ..................... | G02B 6/3878 385/109 |

(Continued)

*Primary Examiner* — Ryan A Lepisto
(74) *Attorney, Agent, or Firm* — ScienBiziP, P.C.

(57) ABSTRACT

An optical fiber shuffle includes a protective shell and a number of crossover optical cables. The protective shell supports and fixes the crossover optical cables. Each of the crossover optical cables includes a support member, a number of first optical cable units, and a number of second optical cable units. The support member is coupled to the number of first optical cable units and the number of second optical cable units. Each of the first optical cable units includes a number of optical fiber units. The optical fiber units extend into the support member, are sequentially redistributed in the support member, and enter into corresponding second optical cable units. Ends of the first optical cable units facing away from the support member and ends of the second optical cable units facing away from the support member are coupled to a corresponding optical module.

12 Claims, 6 Drawing Sheets

(56) References Cited

U.S. PATENT DOCUMENTS

2014/0133822 A1\* 5/2014 de los Santos Campos ................ G02B 6/4471
                                                                    385/137
2018/0275356 A1\* 9/2018 Li ........................ G02B 6/4403
2019/0339470 A1\* 11/2019 Ott ........................ G02B 6/4429

\* cited by examiner

OPTICAL FIBER SHUFFLE

FIELD

The subject matter herein generally relates to optical fiber shuffles.

BACKGROUND

Generally, data centers use multiple switches. To establish a communication connection between two switches, a large number of connectors, and parts, such as a chassis, ports are required. Panels are also required. Such a communication connection may have high signal losses.

BRIEF DESCRIPTION OF THE DRAWINGS

Implementations of the present disclosure will now be described, by way of embodiments, with reference to the attached figures.

DETAILED DESCRIPTION

Figure 1:
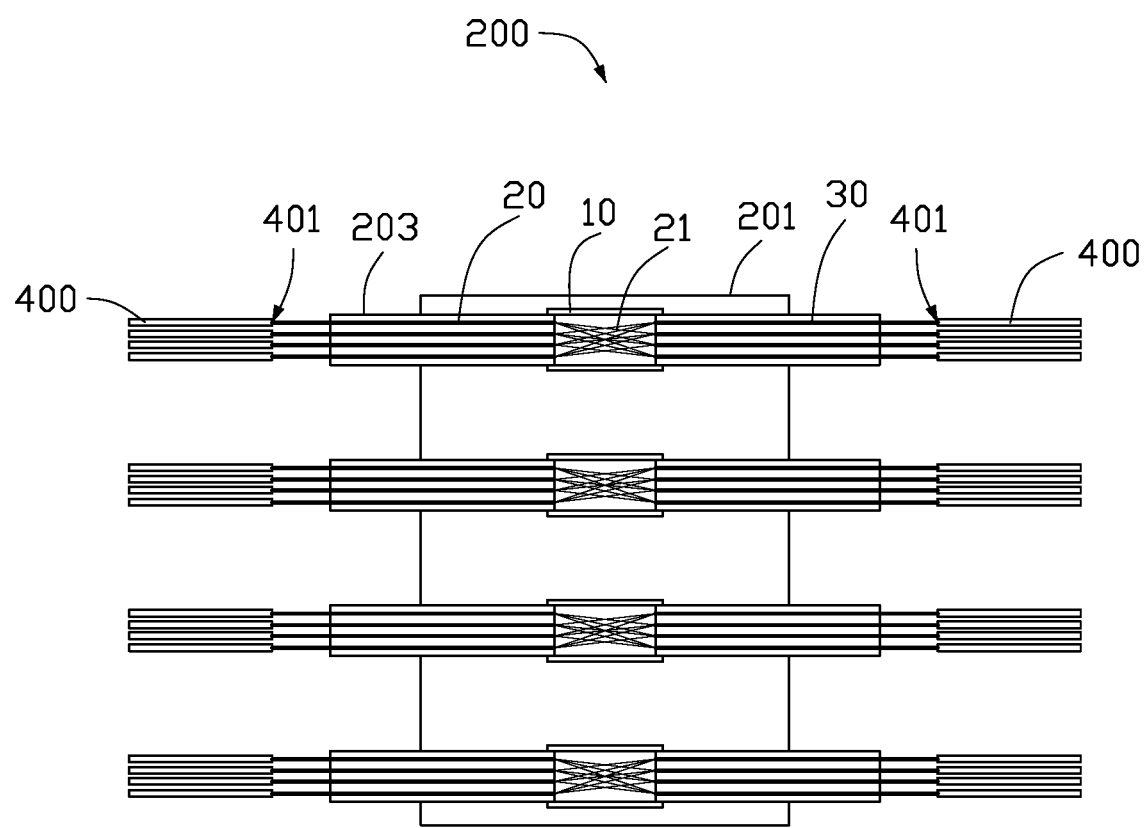
FIG. 1 is a cross-sectional diagram of a first embodiment of an optical fiber shuffle.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

First Embodiment

Figure 2:
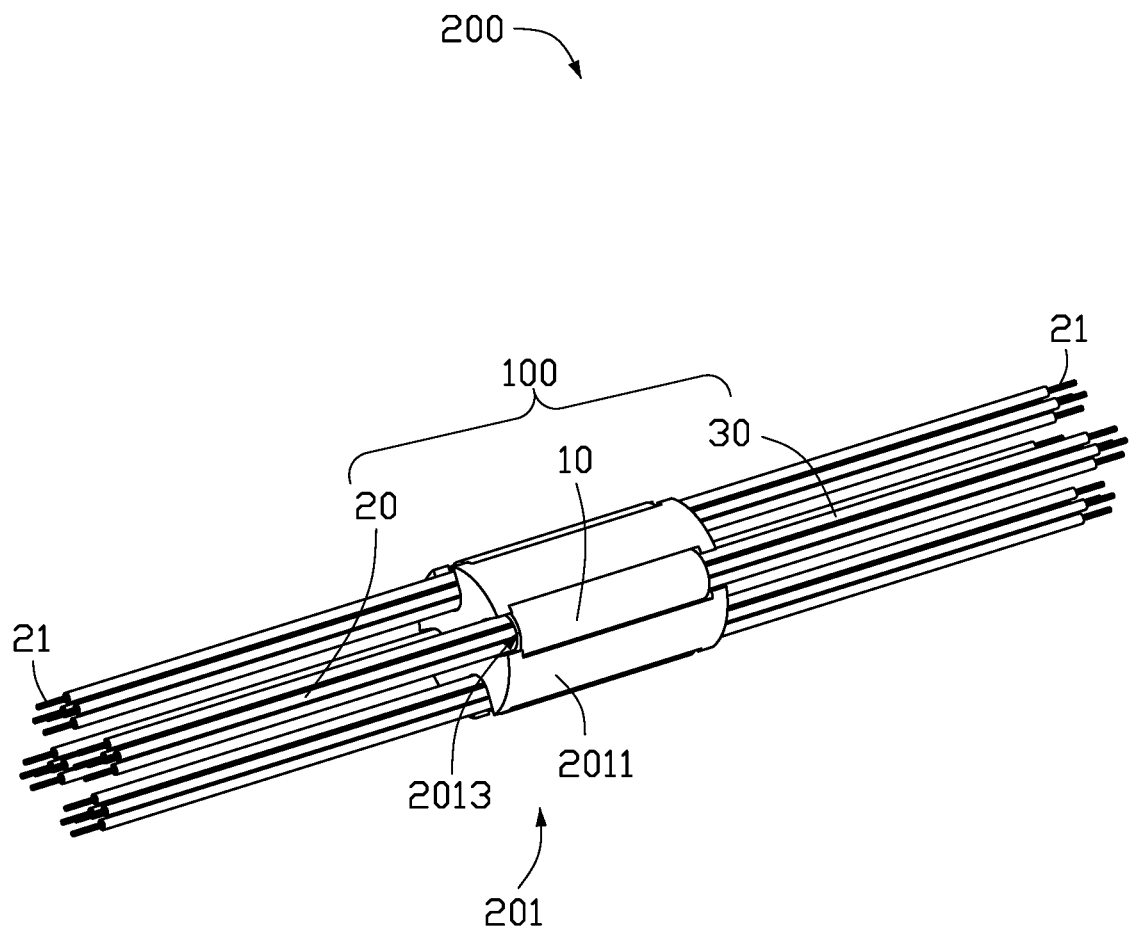
FIG. 2 is an isometric view of the optical fiber shuffle in FIG. 1.

FIG. 1 and FIG. 2 show an embodiment of an optical fiber shuffle 200 for implementing a communication connection between optical switches. The optical fiber shuffle 200 includes a protective shell 201 and a plurality of crossover optical cables 100. The protective shell 201 is used for supporting and fixing the plurality of crossover optical cables 100. Each of the crossover optical cables 100 includes a support member 10, a plurality of first optical cable units 20, and a plurality of second optical cable units 30. The support member 10 is connected to the first optical cable units 20 and the second optical cable units 30. Each of the first optical cable units 20 includes a plurality of optical fiber units 21. Each of the optical fiber units 21 extends into the support member 10. The optical fiber units 21 of the plurality of first optical cable units 20 are sequentially redistributed in the support member 10 and enter into corresponding second optical cable units 30. Each of the first optical cable units 20 and each of the second optical cable units 30 is provided with a connector (not shown) for connecting to an optical module 400.

Figure 3:
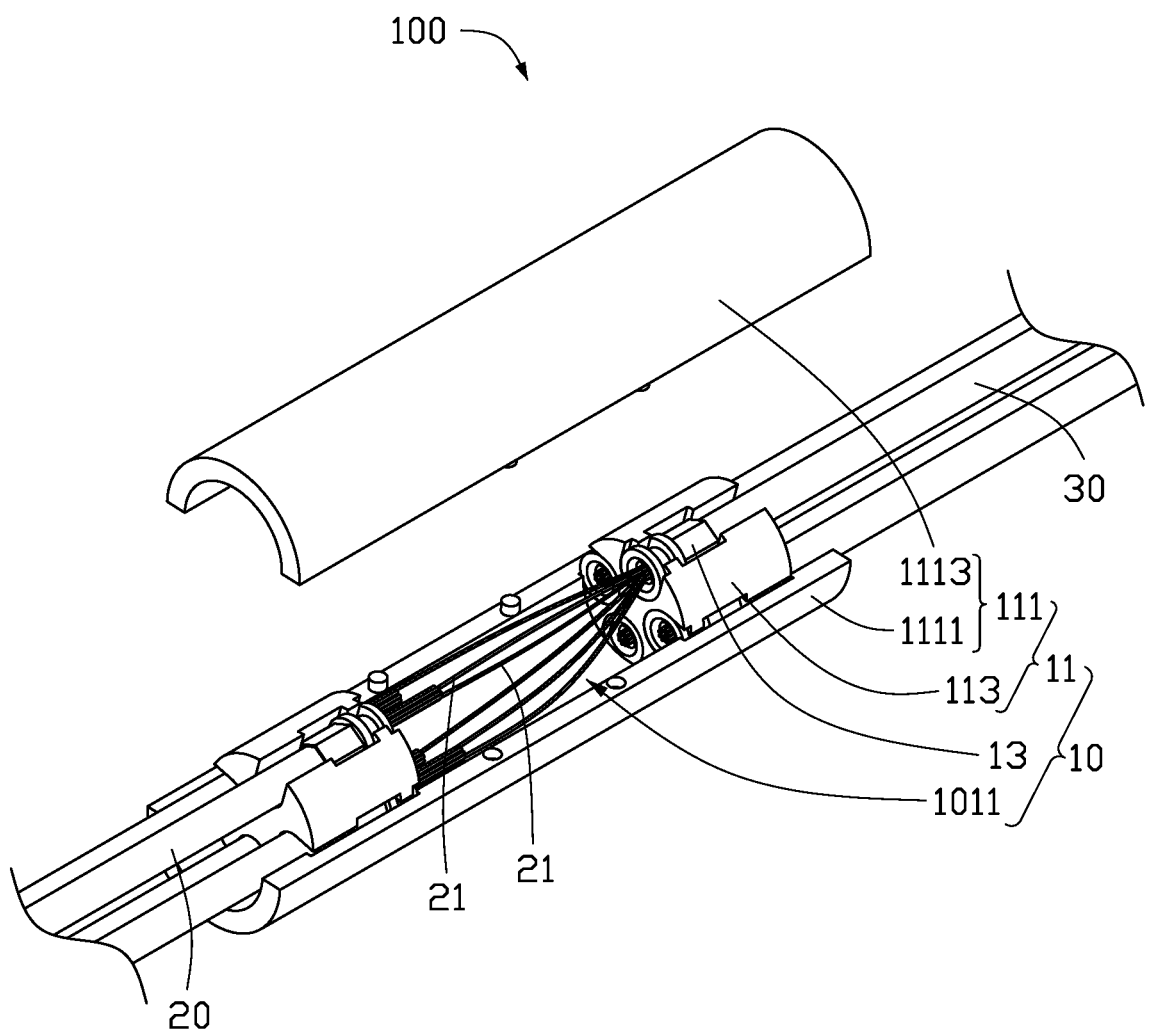
FIG. 3 is an exploded, isometric view of a crossover optical cable of the optical fiber shuffle.

Referring to FIG. 3, the support member 10 includes a shell 11 and a plurality of connecting members 13. Each of the connecting members 13 is located in the shell 11. One end of each first optical cable unit 20 is provided with a corresponding connecting member 13, and the connecting member 13 connects one end of the first optical cable unit 20 to the support member 10. One end of each second optical cable unit 30 is provided with a corresponding connecting member 13, and the connecting member 13 connects the second optical cable unit 30 to the support member 10. The plurality of first optical cable units 20 and the plurality of second optical cable units 30 are oppositely arranged and located in the shell 11. The optical fiber units 21 of the plurality of first optical cable units 20 are sequentially redistributed in the shell 11, and each of the optical fiber units 21 enters into one of the second optical cable units 30, so that the plurality of optical fiber units 21 in the first optical cable unit 20 form the plurality of second optical cable units 30. Ends of the first optical cable units 20 and ends of the second optical cable units 30 facing away from the support member 10 are used for connection with the optical modules 400.

Figure 4:
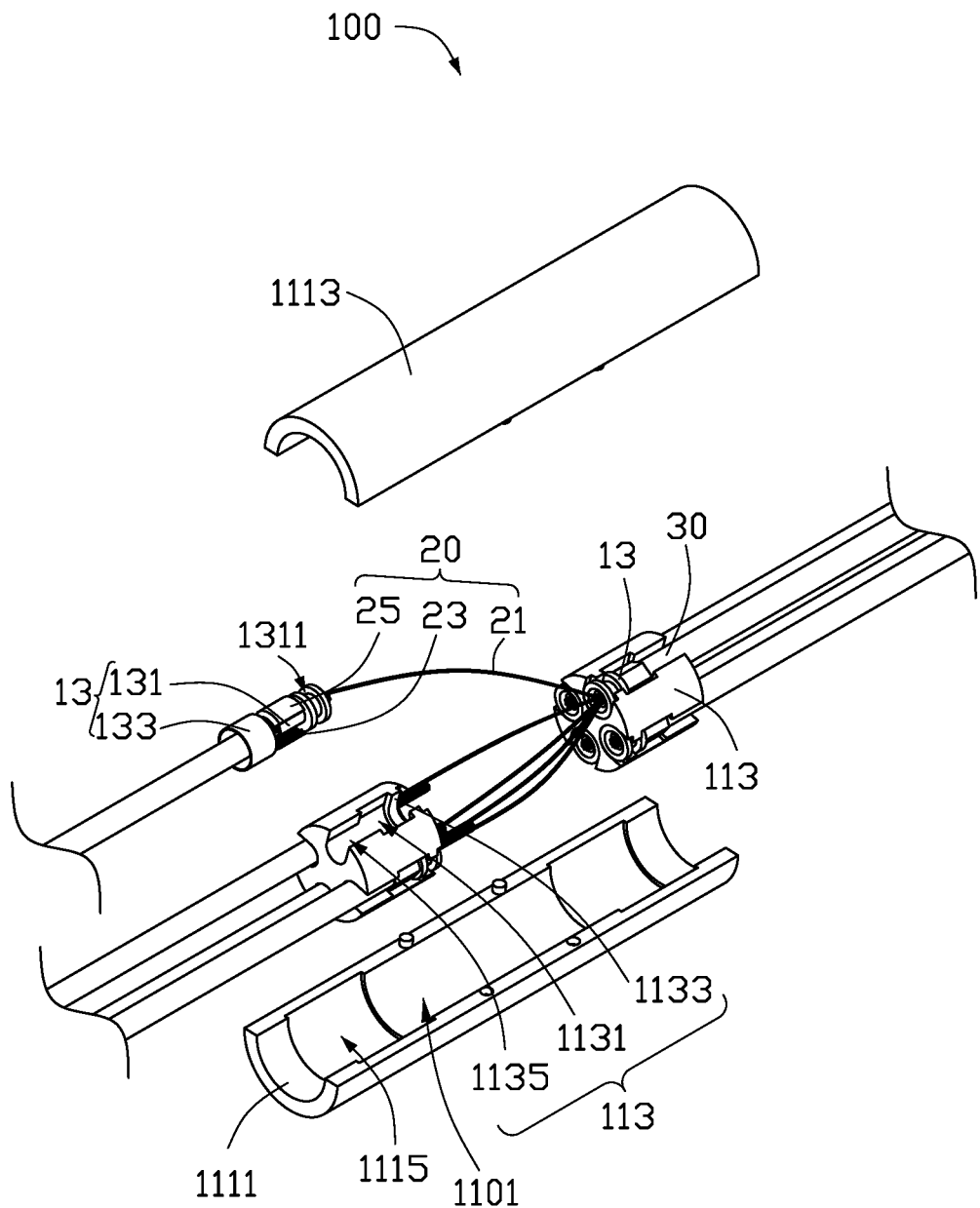
FIG. 4 is an exploded view of FIG. 3.

In the illustrated embodiment, a structure of the first optical cable unit 20 and a structure of the second optical cable unit 30 are substantially the same, but are not limited thereto. Referring to FIG. 4, the first optical cable unit 20 includes a first sheath 23 and a second sheath 25. The first sheath 23 covers the plurality of optical fiber units 21. The second sheath 25 covers the first sheath 23. The first sheath 23 and the second sheath 25 are used to protect the plurality of first optical cable units 20. The first sheath 23 is a sleeve-like structure made of an aramid material, and the second sheath 25 is a heat-shrinkable tube. It can be understood that in other embodiments, the first sheath 23 and the second sheath 25 may also be sleeve-shaped protective structures made of other materials.

The connectors of each of the first optical cable units 20 and the connectors of each of the second optical cable units 30 are adapted to a port 401 of the optical module 400. Two ends of each optical fiber unit 21 are directly connected to the respective optical modules 400 without switching, which reduces loss and eliminates a number of required parts for switching, thereby reducing cost of manufacture.

Referring to FIG. 1, a 16*16 optical module 400 is used as an example to describe a working principle of the above-mentioned optical fiber shuffle 200. The optical fiber shuffle 200 is connected between a first optical module group and a second optical module group. The first optical module group and the second optical module group each include sixteen optical modules 400. Each optical module 400 is provided with a port 401. There are eight optical fiber units 21 in each first optical cable unit 20. One optical module 400 in the first optical module group is connected to one of the first optical cable units 20 of one of the crossover optical cables 100. The eight optical fiber units 21 of each first optical cable unit 20 are rearranged in the support member 10 and enter into different four second optical cable units 30. In one embodiment, every two of the optical fiber units 21 enter one of the second optical cable units 30 to form four second optical cable units 30, but it is not limited thereto. The four second optical cable units 30 are respectively connected to four optical modules 400 in the second optical module group. Therefore, optical signals in channels of each optical module 400 can enter different multiple optical modules 400 through the multiple optical fiber units 21 of the first optical cable units 20, thereby realizing optical connection between the different optical modules 400. Since the optical signals of the first group of optical modules enter the second group of optical modules along the optical fiber units 21 without breakpoints, losses generated in the optical fiber units 21 are small and can be ignored. The present disclosure is designed based on the Clos principle, but is not limited to this, and can be customized according to user needs.

It can be understood that the number of the first optical cable units 20 and the number of the second optical cable units 30 may be the same or different, and the numbers are not limited. The number of the optical fiber units 21 in the plurality of first optical cable units 20 may be the same or different, and the number is not limited. A plurality of the optical fiber units 21 in the first optical cable units 20 may respectively extend into different second optical cable units 30 or partially extend into the same second optical cable unit 30. For example, in other embodiments, the number of the first optical cable units 20 may be three, and the number of the second optical cable units 30 may be two. Three optical fiber units 21 may be provided in one first optical cable unit 20, such that the three optical fiber units 21 all extend into one second optical cable unit 30. Two of the optical fiber units 21 may enter into one of the second optical cable units 30, and the other optical fiber unit 21 may enter another second optical cable unit 30.

Referring to FIG. 2 and FIG. 3, the shell 11 includes a housing 111 and two positioning members 113. A cavity 1101 is defined in the housing 111. The two positioning members 113 are spaced apart in the cavity 1101. A plurality of positioning grooves 1131 is defined in a peripheral wall of the positioning member 113. A number of the positioning grooves 1131 is four, but it is not limited thereto. The number of the positioning grooves 1131 corresponds to the number of the first optical cable units 20 and the second optical cable units 30. Each of the positioning grooves 1131 is used for receiving and positioning the corresponding connecting member 13. One end of the second optical cable unit 30 is fixed to the other positioning member 113 by using the connecting member 13. The optical fiber units 21 of the first optical cable unit 20 extend into the cavity 1101, and then are redistributed so that each of the optical fiber units 21 enters one of the second optical cable units 30 to form a plurality of second optical cable units 30, thereby completing redistribution of the optical fiber units 21 to connect the optical fiber units 21 to different optical modules 400.

In the illustrated embodiment, opposite side walls of the positioning groove 1131 are provided with a holding portion 1133. The holding portion 1133 is substantially U-shaped, but is not limited thereto. The connecting member 13 includes a latching member 131 and a collar 133. One end of the first sheath 23 is sleeved outside the latching member 131. The collar 133 is sleeved outside the second sheath 25 and presses the first sheath 23 to abut against the latching member 131, so that the first optical cable unit 20 and the second optical cable unit 30 are respectively fixedly connected to one of the connecting members 13.

The latching member 131 is provided with a latching slot 1311 corresponding to the holding portion 1133. The holding portion 1133 is latched in the latching slot 1311, so that the connecting member 13 is positioned along an axial direction of the positioning member 113.

In the illustrated embodiment, the housing 111 includes a base body 1111 and a cover body 1113. The cover body 1113 is covered on the base body 1111 to cooperatively form the cavity 1101. Specifically, each of the cover body 1113 and the base body 1111 is substantially a hollow half cylinder having a substantially semicircular cross-section, but is not limited thereto. One of the cover body 1113 and the base body 1111 may be provided with protruding portions, and the other one of the cover body 1113 and the base body 1111 may be provided with holes. The protruding portions are fastened to the locking holes to fix the base body 1111 to the cover body 1113. It can be understood that in other embodiments, the base body 1111 and the cover body 1113 may be fixedly connected by other connection structures.

In the illustrated embodiment, the base body 1111 and the cover body 1113 are respectively provided with alignment grooves 1115 facing each other. The positioning grooves 1115 surround a peripheral wall of the positioning member 113 for receiving the positioning member 113 to position the positioning member 113 in the axial direction. A wall of the positioning groove 1115 abuts the peripheral wall of the positioning member 113 and the connecting member 13 to position the positioning member 113 and the connecting member 13 in a radial direction.

In the illustrated embodiment, the positioning member 113 further defines a receiving groove 1135 that communicates with the positioning groove 1131. The receiving groove 1135 is used for receiving and positioning the first optical cable unit 20 or the second optical cable unit 30. A diameter of the receiving groove 1135 is slightly larger than diameters of the first optical cable unit 20 and the second optical cable unit 30, so that the first optical cable unit 20 or the second optical cable unit 30 is axially aligned with the connecting member 13, and the first optical cable unit 20 and the second optical cable unit 30 will not be bent. It can be understood that in other embodiments, the receiving groove 1135 may be omitted, the positioning groove 1131 penetrates the positioning member 113 in the axial direction, and the first optical cable unit 20 and the second optical cable unit 30 are received in the positioning groove 1131.

Referring to FIG. 4, the protective shell 201 includes a positioning support 2011 and an outer cover (not shown). A plurality of positioning holes 2013 is formed in a peripheral wall of the support 2011 along the axial direction. Each support member 10 is received and positioned in one of the positioning holes 2013. The outer cover is wrapped around the positioning support 2011 to hold the plurality of support members 10 on the support 2011, so that the plurality of crossover optical cables 100 is positioned on the positioning support 2011. The protective shell 201 is used to integrate a plurality of the crossover optical cables 100 so that more of the crossover optical cables 100 are connected to the optical module 400.

Referring to FIG. 1, the plurality of first optical cable units 20 and the plurality of second optical cable units 30 of each of the crossover optical cables 100 may be covered by a protective cover 203 to protect the first optical cable units 20 and the second optical cable units 30. The protective cover 203 may be a woven mesh, a heat shrinkable tube, or the like.

Second Embodiment

Figure 5:
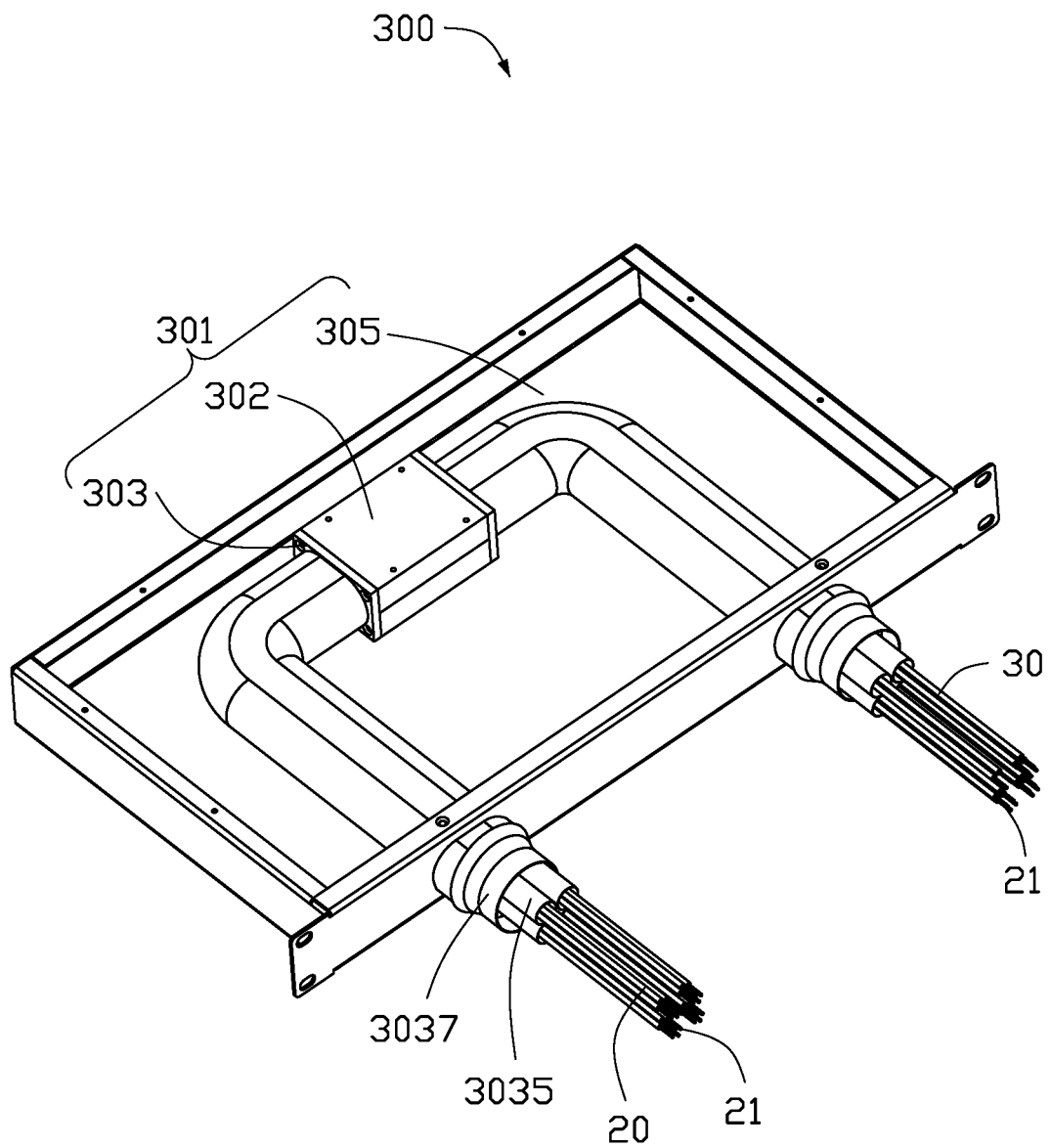
FIG. 5 is an isometric view of a second embodiment of an optical fiber shuffle.
Figure 6:
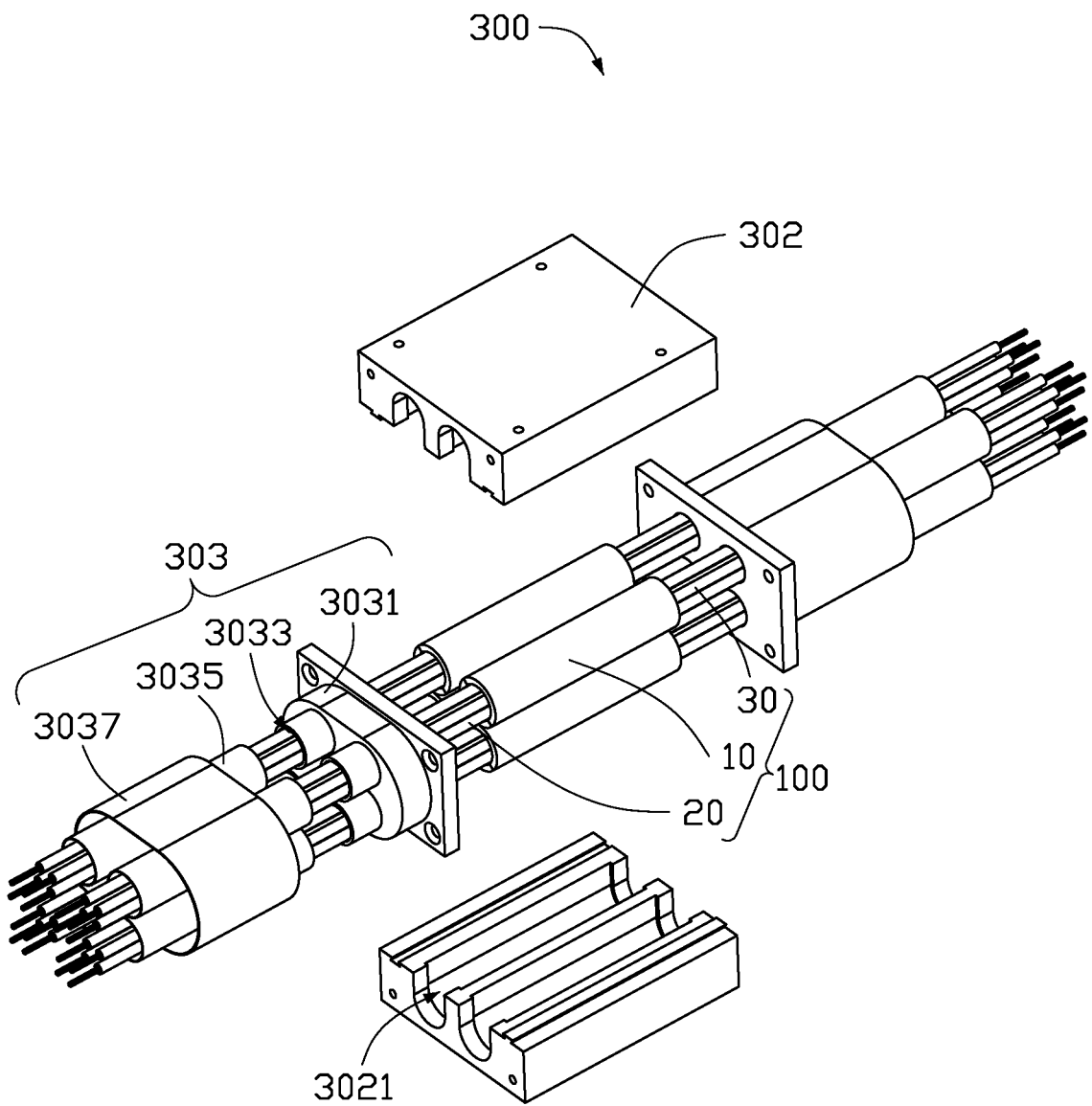
FIG. 6 is a partial exploded view of FIG. 5.

Referring to FIG. 5 and FIG. 6, an optical fiber shuffle 300 includes a protective shell 301 and a plurality of the crossover optical cables 100. The protective shell 301 is used for supporting and fixing the plurality of crossover optical cables 100.

The protective shell 301 includes a base 302 and two protection mechanisms 303. The two protection mechanisms 303 are respectively located on opposite sides of the base 302 and are used to provide a supporting force for the plurality of crossover optical cables 100 to transition on the opposite sides of the base 302. The base 302 is provided with a plurality of channels 3021. The channels 3021 are arranged in parallel and penetrate the opposite sides of the base 302. At least one support member 10 is received and positioned in one of the channels 3021. In the illustrated embodiment, every two of the support members 10 are received in one of the channels 3021, and the first optical cable units 20 and the second optical cable units 30 respectively protrude from the channels 3021, so that a distance between the support members 10 is reduced. The protection mechanism 303 is used to protect the first optical cable units 20 and the second optical cable units 30 to prevent the first optical cable units 20 and the second optical cable units 30 from being excessively bent and damaged.

The protection mechanism 303 includes an adapter 3031, inner sheaths 3035, and an outer sheath 3037. The adapter 3031 is provided with a plurality of through holes 3033. Each through hole 3033 corresponds to one of the crossover optical cables 100 to allow the first optical cable units 20 and the second optical cable units 30 to pass through. Each inner sheath 3035 covers the plurality of first optical cable units 20 or the plurality of second optical cable units 30 of each of the crossover optical cables 100, and one end of the inner sheath 3035 is connected to the adapter 3031. The outer sheath 3037 is wrapped around the plurality of inner sheaths 3035, and one end of the outer sheath 3037 is connected to the adapter 3031. The inner sheaths 3035 and the outer sheath 3037 may be heat-shrinkable tube structures, but are not limited thereto.

The protective shell 301 further includes a chassis 305. The base 302 is located in the chassis 305, and the first optical cable units 20 and the second optical cable units 30 protrude outside the chassis 305. The chassis 305 is a sealable structure able to open and close. The first optical cable units 20 and the second optical cable units 30 protrude outside the chassis 305 after being turned according to need, and are connected to the optical modules 400. Another adapter 3031 is provided on an outer wall of the chassis 305 and is provided on the first optical cable units 20 or the second optical cable units 30 in the same manner as the inner sheaths 3035 and the outer sheath 3037 to protect the first optical cable units 20 or the second optical cable units 30 from being excessively bent and damaged. It can be understood that the chassis 305 may be omitted in other embodiments.

It can be understood that in other embodiments, the protective shell 201, the support member 10, and/or the protective shell 301 may be a set made of soft material.

In the optical fiber shuffle 200 and the optical fiber shuffle 300, the plurality of optical fiber units 21 of the first optical cable units 20 are redistributed in the support member 10, and respectively extend into corresponding second optical cable units 30. The first optical cable units 20 and the second optical cable units 30 are respectively provided with connectors, so that two ends of each of the optical fiber units 21 are respectively directly connected to the corresponding optical modules 400 to realize photoelectric conversion. Thus, communication connection between communication machines is realized without the need for intermediate conversion, and the loss is small.

Further, the optical fiber shuffle 200 and the optical fiber shuffle 300 omit a switching structure. Thus, the cost is reduced.

Further, the optical fiber shuffle 200 and the optical fiber shuffle 300 can reduce a transmission power of the optical modules, thereby reducing an overall power consumption of a data center.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An optical fiber shuffle comprising:
a protective shell; and
a plurality of crossover optical cables; wherein:
the protective shell is configured to support and fix the plurality of crossover optical cables;
each of the plurality of crossover optical cables comprises a support member, a plurality of first optical cable units, and a plurality of second optical cable units;
the support member is coupled to the plurality of first optical cable units and the plurality of second optical cable units;
each of the plurality of first optical cable units comprises a plurality of optical fiber units;
the plurality of optical fiber units extends into the support member, is sequentially redistributed in the support member, and enters into corresponding second optical cable units; and
ends of the plurality of first optical cable units facing away from the support member and ends of the plurality of second optical cable units facing away from the support member are coupled to a corresponding optical module;
wherein the support member comprises a shell and a plurality of connecting members;
each of the plurality of connecting members is located in the shell;
one end of each first optical cable unit is coupled to a corresponding one of the connecting members; and
one end of each second optical cable unit is coupled to a corresponding one of the connecting members.

2. The optical fiber shuffle of claim 1, wherein:
the shell comprises a housing and two positioning members;
a cavity is defined in the housing;
the two positioning members are spaced apart in the cavity;

a plurality of positioning grooves is defined in a peripheral wall of the positioning member; and each of the plurality of positioning grooves is configured to receive and position a corresponding one of the plurality of connecting members.

3. The optical fiber shuffle of claim 2, wherein:
opposite side walls of the positioning groove are provided with a holding portion;
the latching member is provided with latching slots corresponding to the holding portions; and
the holding portions are latched in the latching slots.

4. The optical fiber shuffle of claim 2, wherein:
the housing comprises a base body and a cover body;
the cover body is covered on the base body to cooperatively form the cavity;
the base body and/or the cover body are provided with alignment grooves;
the alignment grooves are configured to respectively receive the positioning members; and
a wall of each positioning groove abuts the peripheral wall of the corresponding positioning member.

5. The optical fiber shuffle of claim 2, wherein:
the positioning member further defines a receiving groove that communicates with the positioning groove; and
the receiving groove is configured to receive and position the first optical cable unit or the second optical cable unit.

6. The optical fiber shuffle of claim 1, wherein: the connecting member comprises a latching member and a collar; the first optical cable unit or the second optical cable unit is located outside of the latching member; the collar is located outside of the first optical cable unit or the second optical cable unit; and the first optical cable unit or the second optical cable unit abuts against the latching member.

7. The optical fiber shuffle of claim 1, wherein:
the protective shell comprises a positioning support;
a plurality of positioning holes is formed in a peripheral wall of the support member and extends along an axial direction of the support member; and
each support member is received and positioned in a corresponding one of the positioning holes.

8. The optical fiber shuffle of claim 1, wherein:
the protective shell and/or the support member are made of a soft material.

9. The optical fiber shuffle of claim 1, wherein:
the protective shell comprises a base and two protection mechanisms;
the two protection mechanisms are respectively located on opposite sides of the base;
the base is provided with a plurality of channels;
each of the plurality of channels is configured to receive and position at least one support member.

10. The optical fiber shuffle of claim 9, wherein:
the protection mechanism comprises an adapter, a plurality of inner sheaths, and an outer sheath;
the adapter is provided with a plurality of through holes;
each of the plurality of through holes corresponds to one of the crossover optical cables;
each inner sheath covers the plurality of first optical cable units or the plurality of second optical cable units of each of the crossover optical cables;
one end of each inner sheath is coupled to the adapter;
the outer sheath is wrapped around the plurality of inner sheaths, and one end of the outer sheath is coupled to the adapter.

11. The optical fiber shuffle of claim 9, wherein:
the protective shell further comprises a chassis; and
the base is located in the chassis.

12. An optical fiber shuffle comprising:
a protective shell; and
a plurality of crossover optical cables extending through the protective shell; wherein:
each of the plurality of crossover optical cables comprises a support member, a plurality of first optical cable units, and a plurality of second optical cable units, the plurality of first optical cable units arranged opposite to the plurality of second optical cable units;
the support member is coupled between the plurality of first optical cable units and the plurality of second optical cable units;
each of the plurality of first optical cable units comprises a plurality of optical fiber units;
the plurality of optical fiber units extends into the support member, is sequentially redistributed in the support member, and enters into corresponding second optical cable units; and
ends of the plurality of optical fiber units are directly coupled to corresponding optical modules;
wherein the support member comprises a shell and a plurality of connecting members;
each of the plurality of connecting members is located in the shell;
one end of each first optical cable unit is coupled to a corresponding one of the connecting members; and
one end of each second optical cable unit is coupled to a corresponding one of the connecting members.

\* \* \* \* \*